(12) United States Patent
Huang et al.

(10) Patent No.: US 12,551,123 B2
(45) Date of Patent: Feb. 17, 2026

(54) PULSE DIAGNOSIS DEVICE

(71) Applicant: AU OPTRONICS CORPORATION, Hsin-Chu (TW)

(72) Inventors: Chung-Chin Huang, Hsin-Chu (TW); Po-Hung Lin, Hsin-Chu (TW); Min-Qian Jiang, Hsin-Chu (TW); Yi-Han Chang, Hsin-Chu (TW); Hao-Lun Hsieh, Hsin-Chu (TW); Wen-Bin Hsu, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 1086 days.

(21) Appl. No.: 17/533,673

(22) Filed: Nov. 23, 2021

(65) Prior Publication Data

US 2022/0338749 A1 Oct. 27, 2022

(30) Foreign Application Priority Data

Apr. 23, 2021 (TW) .................................. 110114789

(51) Int. Cl.
*A61B 5/00* (2006.01)
*A61B 5/024* (2006.01)

(52) U.S. Cl.
CPC ...... *A61B 5/02444* (2013.01); *A61B 5/02438* (2013.01)

(58) Field of Classification Search
CPC ............ A61B 5/02444; A61B 5/02438; A61B 2562/0247; A61B 5/0295; A61B 5/4854
See application file for complete search history.

(56) References Cited

U.S. PATENT DOCUMENTS

| 2004/0010198 A1* | 1/2004 | Yamakoshi | ............ A61B 5/681 600/499 |
| 2012/0130261 A1* | 5/2012 | Fujita | ................... A61B 5/6887 600/500 |
| 2013/0046191 A1 | 2/2013 | Lin et al. | |

FOREIGN PATENT DOCUMENTS

| CN | 101015450 A | * | 8/2007 | |
| CN | 102949187 A | | 3/2013 | |
| CN | 103654743 A | | 3/2014 | |
| CN | 106725363 A | * | 5/2017 | ............... A61B 5/02 |
| CN | 211066567 U | * | 7/2020 | |
| CN | 108078553 B | | 2/2021 | |
| CN | 108968930 B | | 2/2021 | |

* cited by examiner

*Primary Examiner* — Etsub D Berhanu
*Assistant Examiner* — Lucy Eppert
(74) *Attorney, Agent, or Firm* — WPAT, PC (57) ABSTRACT

The present invention provides a pulse diagnosis device including at least one bellow, at least one sensor, and a locating element. The bellow has a sensing surface having a first end and a second end opposite to each other. The sensor is disposed on the sensing surface and has a sensing area at least partially extending from the first end to the second end or protruding from the second end. The locating element is at least partially disposed along the second end to position the sensor at the second end, wherein the sensing area does not overlap with the locating element at least partially.

14 Claims, 8 Drawing Sheets

PULSE DIAGNOSIS DEVICE

BACKGROUND OF THE INVENTION

1. Field of the Invention

The present invention relates to a pulse diagnosis device. Specifically, the present invention relates to a pulse diagnosis device with a sensor disposed on a bellow.

2. Description of the Prior Art

In traditional Chinese medicine, pulse is determined by doctors of Chinese Medicine using their fingers; however, everyone has different sensitivities to fingertips and measurement results are also affected by subjectivities of doctors of Chinese Medicine. Therefore, it is difficult to achieve the demands of qualitative and quantitative using finger measurement methods.

Currently, some institutes have developed pulse diagnosis devices configured to measure pulses automatically. The pulse diagnosis devices generally use photoelectric sensors or pressure sensors. Wherein, it is difficult for photoelectric sensors to correspond to the finger senses of doctors of Chinese Medicine; therefore, the theory of pulse diagnosis thereof is different from the traditional theory. On the other hand, the pressure sensors include capacitive sensors, resistive sensors, or piezoelectric sensors. Each type of pressure sensors needs to be used with pressurization elements; however, when the sensor measures only one of inch, bar, and cubit, the degree of resolution at the detection point is not ideal. In addition, currently, pulses cannot be measured accurately due to the designs of the pressurization elements and the capabilities of the sensors themselves.

In order to enhance the accuracy of measuring pulses, a pulse diagnosis device has been developed to expand the convex structure of a sensor into a depressed area between bone and tendon by pressurizing a bladder. However, since inch, bar, and cubit have different depths, and everyone has different slope changes among inch, bar, and cubit, it is also difficult to measure every person accurately even if a bladder is used.

In addition, currently, the sensors are generally fixed on a bladder by double-sided tape; however, in general, the flexibility (that is, expansibility or contractility) of the bladder is larger than the flexible sensor; therefore, when the sensor is pressurized by the bladder, the surface tension of the sensor is not uniform, and abnormal pressure distribution can easily occur. The ways to dispose sensors of the existing pulse diagnosis devices have room for improvement in many aspects.

SUMMARY OF THE INVENTION

The present invention intends to provide a pulse diagnosis device having a sensor positioned on a bellow so as to enhance the accuracy of the sensor and the practicability of the pulse diagnosis device.

The present invention provides a pulse diagnosis device including at least one bellow, at least one sensor, and at least one positioning element. The bellow has a sensing area, and the sensing surface has a first end and a second end opposite to each other. The sensor is disposed on the sensing surface and has a sensing area at least partially extending from the first end to the second end or beyond the second end. The positioning element is at least partially disposed along the second end to position the sensor at the second end, wherein the sensing area does not overlap with the locating element at least partially.

The sensor positioned on the bellow by the aforementioned way not only can measure each pulse more accurately but also decrease the effects on the measuring results caused by each person's different slope changes among inch, bar, and cubit.

DETAILED DESCRIPTION OF THE PREFERRED EMBODIMENT

In the drawings, for the purpose of clarification, the thicknesses of layers, films, panels, regions and the like are amplified. In the whole specification, the same marks represent the same element. It should be understood that, when an element such as a layer, a film, a panel, a region or a substrate are described as "being on" or "being connected to" another element, they may be directly on or connected to another element, or there may be other elements therebetween. On the other hand, when an element is described as "directly existing on another element" or "being directly connected to" another element, there is no element therebetween. As used in the present specification, a "connection" may be a physical and/or electrical connection. In addition, an "electrical connection" or "coupling" means that other elements may exist there between.

It should be understood that, even though the terms such as "first", "second", "third" may be used to describe an element, a part, a region, a layer and/or a portion in the present specification, but these elements, parts, regions, layers and/or portions are not limited by such terms. Such terms are merely used to differentiate an element, a part, a region, a layer and/or a portion from another element, part, region, layer and/or portion. Therefore, in the following discussions, a first element, portion, region, layer or portion may be called a second element, portion, region, layer or portion, and do not depart from the teaching of the present disclosure.

The terms used here only intends to describe the specific embodiments and does not intend to limit the scope of the invention. As used in the specification, single forms "a", "one", "the" include multiple forms including "at least one" unless further instructed clearly. The term "or" represents "and/or". As used in the specification, the term "and/or" include one or combination of some or all listed items. It should be further understood that when used in the present specification, the terms "comprising" and/or "including" point out existences or attachments of the features, areas, integrations, steps, operations, elements and/or components but do not exclude existences or one or more other features, areas, integrations, steps, operations, elements, components and/or combination thereof.

In addition, relative terms such as "lower" or "bottom" and "on" or "top" may be used to describe the relationship between an element and another element in the present specification, as shown in the FIGs. It should be understood that the purpose of using relative terms is to include the different directions of the devices not shown in the FIGs. For example, if a device in an attached FIG is turned upside down, an element described as being "under" another element will be "on top of" that element. Therefore, a descriptive term "under" may include the meaning of both "under" and "on top of", depending on the specific orientation of the attached FIG.

The terms "about," "approximate" or "essentially" used in the present specification include the value itself and the average values within the acceptable range of deviation of the specific values confirmed by a person having ordinary skill in the present art, considering the specific measurement discussed and the amount of errors related to such measurement (that is, the limitation of the measurement system). For example, "about" may mean within one or more standard deviations of the value itself, or within ±30%, ±20%, ±10%±5%. In addition, "about", "approximate" or "essentially" used in the present specification may select a more acceptable range of deviation or standard deviation based on optical property, etching property or other properties. One cannot apply one standard deviation to all properties.

If not defined specifically, all terms in the specifications (including terms about technology and science) have the same meaning as those understood by those who have ordinal skill in the art. It should be further understood that, for example, the terms defined in commonly used dictionaries should be interpreted as having a meaning that is consistent with their meaning in the context of the relevant art and the present disclosure, and should not be interpreted in an idealized or overly formal sense unless expressly so defined herein.

Figure 1A:
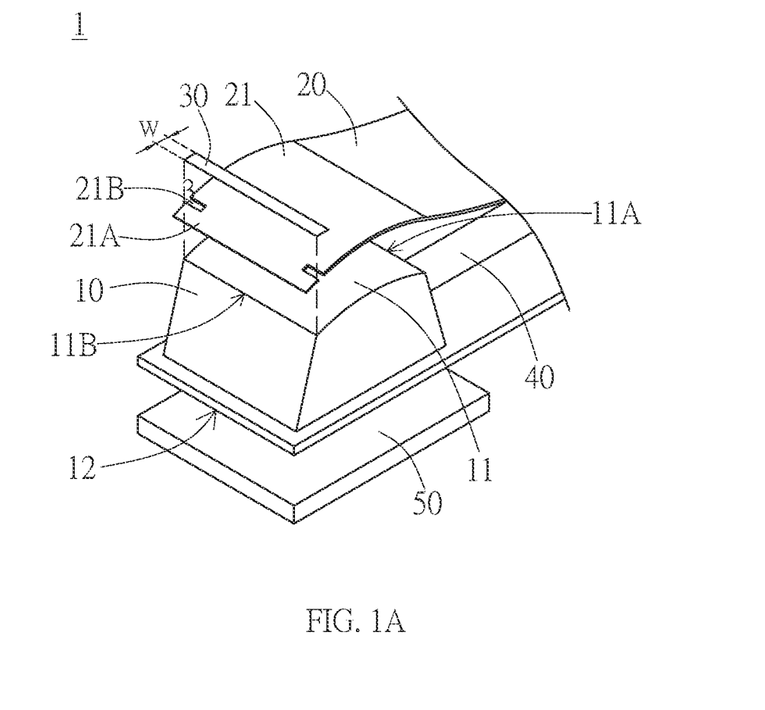
FIG. 1A illustrates an exploded drawing of a pulse diagnosis device according to the first embodiment of the present invention.
Figure 1B:
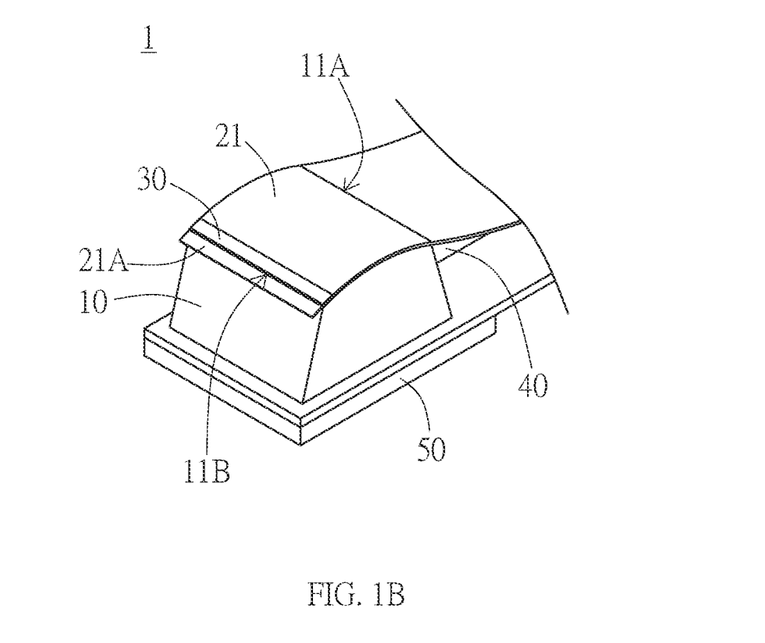
FIG. 1B illustrates a three-dimensional view of a pulse diagnosis device according to the first embodiment of the present invention.
Figure 1C:
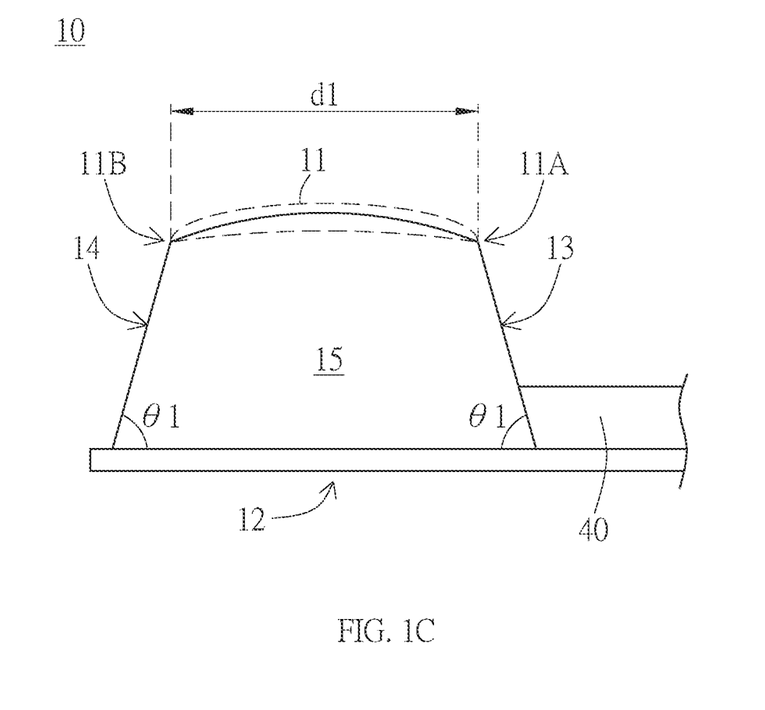
FIG. 1O illustrates a side view of a bellow in a pulse diagnosis device according to the first embodiment of the present invention seen from a direction.
FIG. 1D illustrates a side view of a bellow in the pulse diagnosis device according to the first embodiment of the present invention seen from the other direction.

Please refer to FIG. 1A and FIG. 1B. FIGS. 1A and 1B illustrate an exploded drawing and a three-dimensional view of a pulse diagnosis device 1 according to the first embodiment of the present invention, respectively. As illustrated in FIG. 1A and FIG. 1B, the pulse diagnosis device 1 of the present invention includes a bellow 10, a sensor 20 and a positioning element 30. The bellow 10 has a sensing surface 11 and a bottom surface 12 opposite to each other; and the sensing surface 11 has a first end 11A and a second end 11B opposite to each other. The sensor 20 is disposed on the sensing surface 11 and has a sensing area 21. At least part of the sensing area 21 extends from the first end 11A to the second end 11B. In addition, in the present embodiment, the sensor 20 has a front-end portion 21A beyond the second end 11B. The positioning element 30 is at least partially disposed along the second end 11B so as to position the sensor 20 at the second end 11B. In the present embodiment, the front-end portion 21A may selectively have a fitting portion 21B (such as a barb) to fit with the positioning element 30 so as to avoid departing from the second end 11B due to excessive pull; however, the way to increase fixity in the present invention is not limited thereto. In addition, in the present embodiment, the sensing area 21 is preferably at least partially positioned on the first end 11A on which the positioning element 30 is not disposed by adhesion. In other words, in the present embodiment, the sensing area 21 is not directly fixed at the second end 11B by adhesion; therefore, appropriate flexibility or possibility of displacement can be still kept within the limitation of the positioning element 30.

In the present embodiment, the positioning element 30 is a single film (securing tape) whose width w ranges from about 1 mm to 3 mm. And when the sensing surface 11 is formed (for example, by injection molding or other manufacturing methods), the positioning element 30 may be at least partially fixed on the second end 11B at the same time (for example, two ends of the positioning element 30 may be fixed on two ends of the second end 11B, respectively). After that, the sensing area 21 is extended between the positioning element 30 and the sensing surface 11. Thus, the volume of the bellow 10 after inflating and the overlapped area between the sensing area 21 and the positioning element 30 can be decreased, and fixity and adjustability of the surface tension of the sensor 20 can be balanced. However, the present invention is not limited thereto. In another embodiment, in the case of at least part of the sensing area 21 not being overlapped (pasted) with the positioning element 30, the positioning element 30 may also include a plurality of securing tapes disposed on a portion other than the second end 11B so as to strengthen the fixity.

In the present embodiment, the sensor 20 has flexibility so that good adjustability of surface tension can be achieved. In an actual application, the bellow 10 may be a bladder; and the pulse diagnosis device 1 may include a tube 40 and an air pump (not illustrated). The air pump is connected to a portion of the bellow 10 near the bottom surface 12 through the tube 40 so as to inflate the bellow 10. When the bellow 10 is inflated to cause the deformation of the sensing surface 11, or the sensing surface 11 is deformed due to contact with the test subject, the sensor 20 may be curved corresponding to the received external force.

In the present embodiment, the bellow 10 may be processed by a high frequency press-fit. As shown in FIG. 1A, in the present embodiment, the bottom surface 12 of the bellow 10 is preferably made of a hard material or disposed on a bottom plate 50 made of a hard material. The thickness of the bottom plate 50 preferably ranges from 0.5 mm to 10 mm. In another embodiment, a hard material may also be embedded in the bottom surface 12 of the bellow 10 in the process of high frequency press-fit without disposing the bottom plate 50; the present invention is not limited thereto.

Figure 1D:
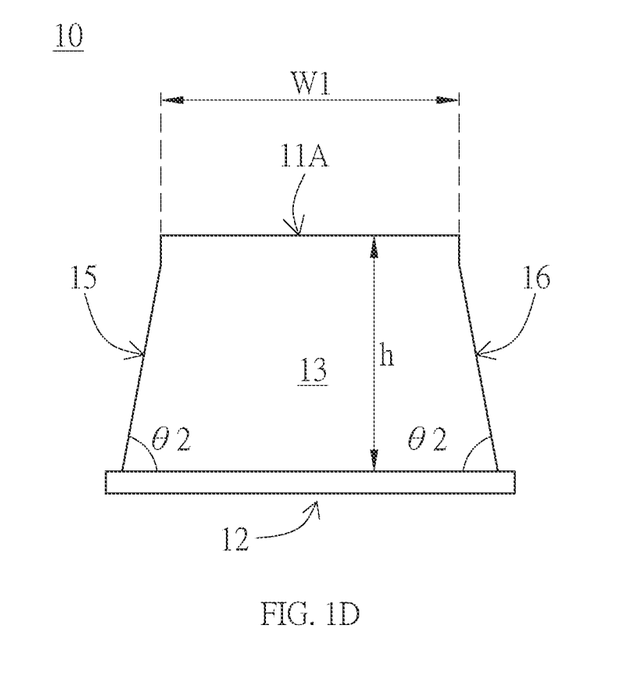

Please refer to FIG. 10 and FIG. 1D. FIG. 10 and FIG. 1D illustrate side views of the bellow 10 of the pulse diagnosis device 1 according to the first embodiment seen from the side between the first end 11A and the second end 11B and from the front of the first end 11A, respectively. In some embodiments, as shown in FIG. 10, the bellow 10 has a first side surface 13 and a second side surface 14 located under the first end 11A and the second end 11B, respectively. Preferably, a distance d1 between the first end 11A and the second end 11B ranges from 12.5 mm to 17.5 mm so that better measurement results can be achieved. In the present embodiment, in a cross-section illustrated in FIG. 10, the bellow 10 has a lateral symmetry structure, the sensing surface 11 is formed to be a curved surface. And the first side surface 13 and the second side surface 14 are inclined towards the outside of the first end 11A and the second end 11B, respectively. For example, the first angle θ1 included between the first side surface 13 (or the second side surface 14) and the bottom surface 12 in the plane ranges from 60 degrees to 75 degrees; however, the gradient between the first side surface 13 and the second side surface 14 and the size of the bellow 10 are not limited thereto.

FIG. 1D illustrates the side view of the bellow 10 seen from the outside of the first end 11A. As shown in FIG. 1D, the width W1 of the first end 11A preferably ranges from 10.5 mm to 15.5 mm. The height h of the bellow 10 preferably ranges from 8.3 mm to 12.3 mm. FIG. 1D illustrates the side view seen from the first end 11A as an example. In the present embodiment, the bellow 10 may have the same structure along the direction of the distance d1, and the side view of the bellow 10 seen from the second end 11B may be identical to FIG. 1D; therefore, the width of the second end 11B may be same as the first end 11A; however, the bellow 10 of the present invention is not limited thereto. In the present embodiment, the bellow 10 has a lateral symmetry structure on a plane surface illustrate in FIG. 1D. And an second angle θ2 included between the third side surface 15 (or the fourth side surface 16) and the bottom surface 12 of the bellow 10 ranges from 75 degrees to 88 degrees, wherein, the third side surface 15 and the fourth side surface 16 are located between the first side surface 13 and the second side surface 14 and are opposite to each other; that is, inclinations of the third side surface 15 and the fourth side surface 16 are smaller than those of the first side surface 13 and the second side surface 14 so that the structure of the bellow 10 is stable; however, the structure of the bellow 10 of the present invention is not limited thereto.

Figure 2A:
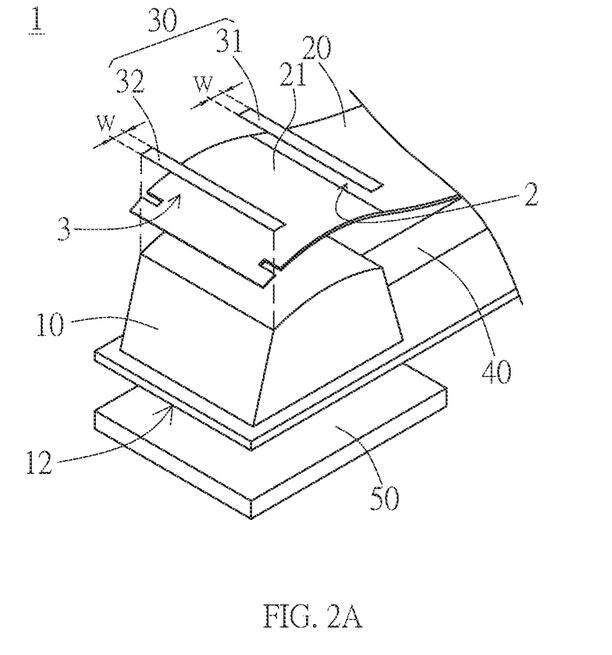
FIG. 2A illustrates an exploded drawing of the pulse diagnosis device according to the second embodiment of the present invention.
Figure 2B:
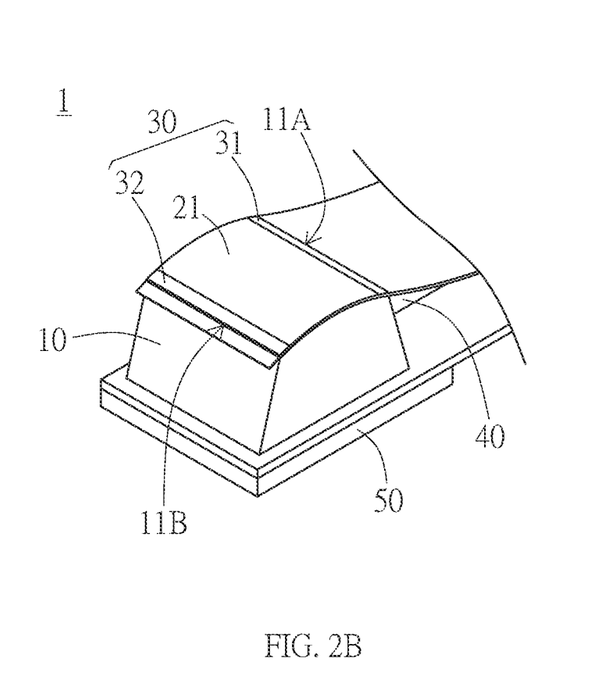
FIG. 2B illustrates an exploded drawing of the pulse diagnosis device according to the second embodiment of the present invention.

Please refer to FIG. 2A and FIG. 2B. FIG. 2A and FIG. 2B respectively illustrate an exploded drawing and a three-dimensional view of the pulse diagnosis device 1 according to the second embodiment. In the present embodiment, the positioning element 30 includes a first portion 31 and a second portion 32, and the first portion 31 and the second portion 32 are disposed along the first end 11A and the second end 11B, respectively. As shown in FIGS. 2A and 2B, a first hole 2 is formed between the first portion 31 and the first end 11A so that at least part of the sensor 20 can pass through there. And a second hole 3 is formed between the second portion 32 and the second end 11B. The sensor 20 at least partially extends from the first hole 2 to the inside of the second hole 3 or passes through the second hole 3 to extend beyond the second end 11B so that the sensing area 21 is located between the first portion 31 and the second portion 32. In the present embodiment, the first portion 31 and the second portion 32 may be films (securing tapes) whose width w ranges from about 1 mm to 3 mm, and the two ends thereof may be fixed on the two ends of the first end 11A and the second end 11B using high frequency press-fit, respectively; however, the present invention is not limited thereto. Parts of the sensor 20 can be positioned on the first end 11A and the second end 11B at the same time using the first portion 31 and the second portion 32, so that the stableness (fixity strength) between the sensor 20 and the sensing surface 11 is further strengthen. However, the present invention is not limited thereto, it is also possible to only dispose the second portion 32 without disposing the first portion 31 in accordance with the first embodiment.

Figure 3A:
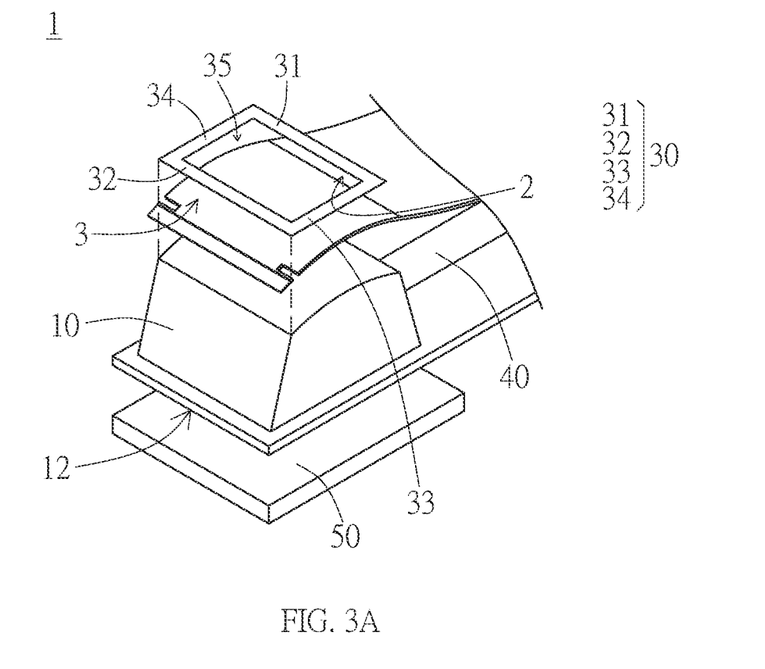
FIG. 3A illustrates an exploded drawing of the pulse diagnosis device according to the third embodiment of the present invention.
Figure 3B:
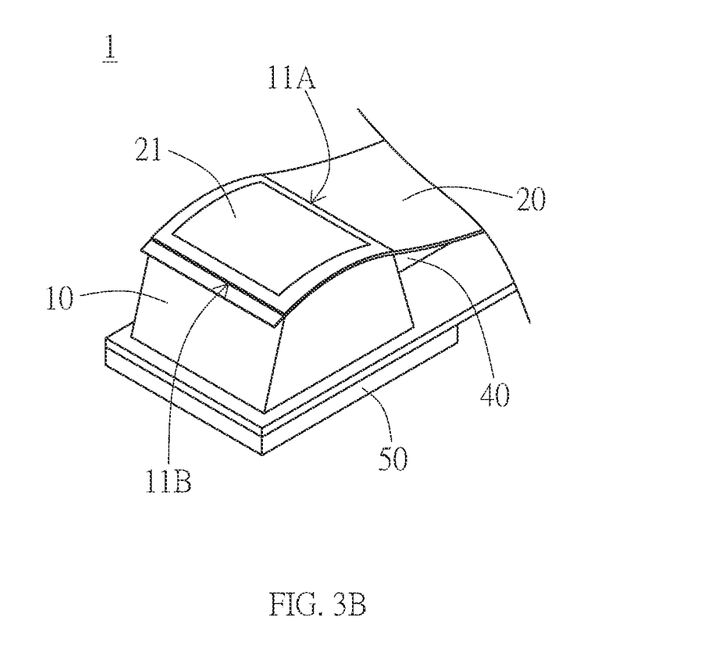
FIG. 3B illustrates a three-dimensional view of the pulse diagnosis device according to the third embodiment of the present invention.

Please refer to FIG. 3A and FIG. 3B. FIG. 3A and FIG. 3B respectively illustrate an exploded drawing and a three-dimensional view of the pulse diagnosis device 1 according to the third embodiment. The third embodiment is different from the second embodiment in that the positioning element 30 further includes a third portion 33 and a fourth portion 34 opposite to each other, and the third portion 33 and the fourth portion 34 are both between the first portion 31 and the second portion 32 so as to form a frame connected to the edges of the sensing surface 11 or the outside thereof. As shown in FIG. 3A, the first portion 31, the second portion 32, the third portion 33, and the fourth portion 34 together enclose a window portion 35, and the sensing area 21 overlaps the window portion 35 at least partially (for example, the parts having the sensor). Furthermore, in the present embodiment, the positioning element 30 is a quadrilateral (each of the first portion 31, the second portion 32, the third portion 33, and the fourth portion 34 is a side of quadrilateral) open window film having the window portion 35 at the center thereof. With this configuration, the stableness of the sensor 20 at each edge of the sensing surface 11 can be strengthened.

Figure 4A:
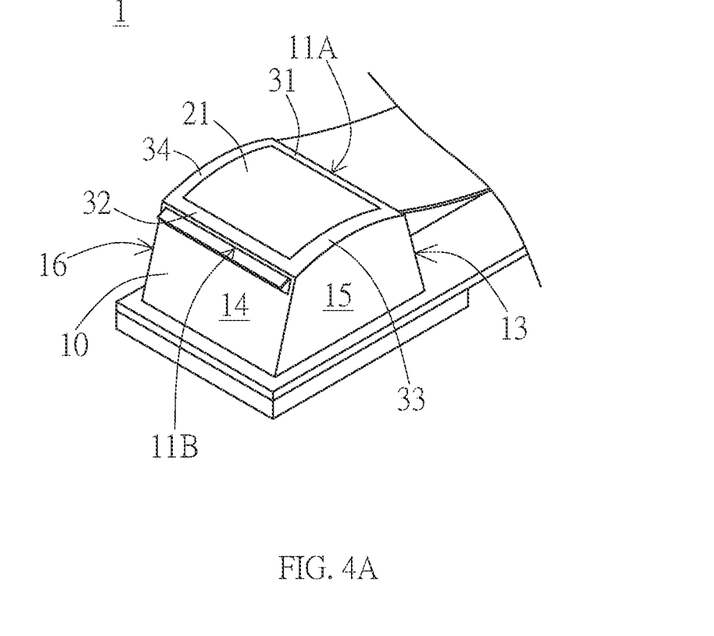
FIG. 4A illustrates a three-dimensional view of the pulse diagnosis device according to the fourth embodiment of the present invention.
Figure 4B:
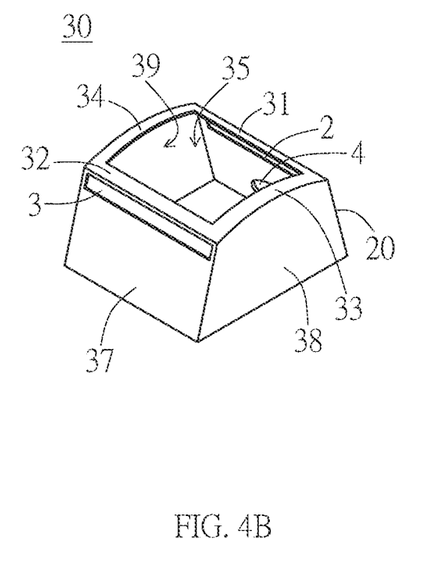
FIG. 4B illustrates a three-dimensional view of a positioning element in the pulse diagnosis device according to the fourth embodiment of the present invention seen from a direction.
Figure 4C:
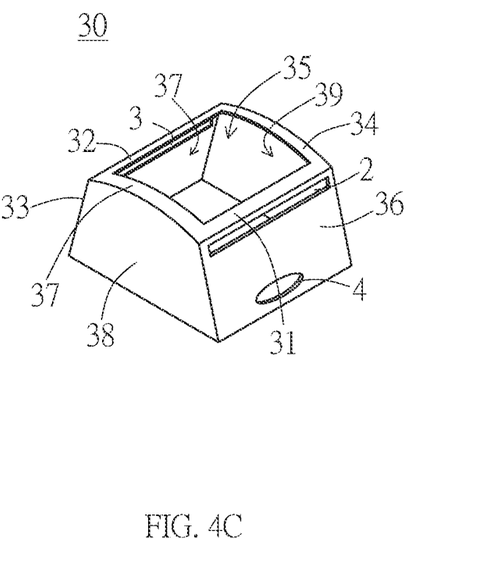
FIG. 4C illustrates a three-dimensional view of the positioning element in the pulse diagnosis device according to the fourth embodiment of the present invention seen from the other direction.

Please refer to FIGS. 4A, 4B, and 4C. FIG. 4A illustrates an exploded view of the pulse diagnosis device 1. FIG. 4B and FIG. 4C illustrate three-dimensional views of the positioning element 30 seen from different directions. In the present embodiment, as shown in FIG. 4A, the bellow 10 and the sensor 20 may be disposed in completely or approximately the same way as the embodiment illustrated in FIG. 3A and FIG. 3B. The main difference is that as shown in FIG. 4A, FIG. 4B, and FIG. 4C, in the present embodiment, the positioning element 30 further includes a first surface 36, a second surface 37, a third surface 38, and a fourth surface 39 in addition to the first portion 31, the second portion 32, the third portion 33, and the fourth portion 34. In other words, in the present embodiment, the positioning element 30 has four side surfaces and an envelope-like structure having the window portion 35 on its top surface covering the outside of the bellow 10. Wherein, the first surface 36 extends from the first end 11A to the bottom surface 12 along the first side surface 13 of the bellow 10; the second surface 37 extends from the second end 11B to the bottom surface 12 along the second side surface 14 of the bellow 10; the third surface 38 and the fourth surface 39 are both between the first surface 36 and the second surface 37, and respectively extends from the third portion 33 and the fourth portion 34 to the bottom surface 12 along the third side surface 15 and the fourth side surface 16 (please further refer to the bellow 10 illustrated in FIG. 10 and FIG. 1D). In other words, in the present embodiment, the first surface 36, the second surface 37, the third surface 38 and the fourth surface 39 are disposed slidably along the first side surface 13, the second side surface 14, the third side surface 15, and the fourth side surface 16, respectively. However, the present invention is not limited thereto. The positioning element 30 can also have a structure with two side surfaces without including the third surface 38 and the fourth surface 39 in accordance with the actual needs.

Please refer to FIG. 4B and FIG. 4C. As shown in FIG. 4B and FIG. 4C, the first hole 2 is located between the first portion 31 and the first surface 36; the second hole 3 is located between the second portion 32 and the second surface 37; and an opening portion 4 is located between the first surface 36 and the bottom surface 12. In an actual application, as shown in FIG. 4A, the sensor 20 at least partially extends from the first hole 2 to the second hole 3 or out of the second end 11B from the second hole 3. The tube 40 is connected to the bellow 10 through the opening portion 4. Thus, the positioning and the fixity of the sensor 20 on the bellow 10 can be further enhanced by using the positioning element 30 formed as an envelope-like structure. However, the present invention is not limited thereto, the positioning element 30 according to any one of the first embodiment to the fourth embodiment can be selected based on a balanced consideration between the costs and the actually required fixity. In addition, as long as the sensor 20 is positioned on the second end 11B and at least part of the sensing area 21 does not overlap the positioning element 30, such an embodiment belongs to the scope of the present invention.

Figure 5A:
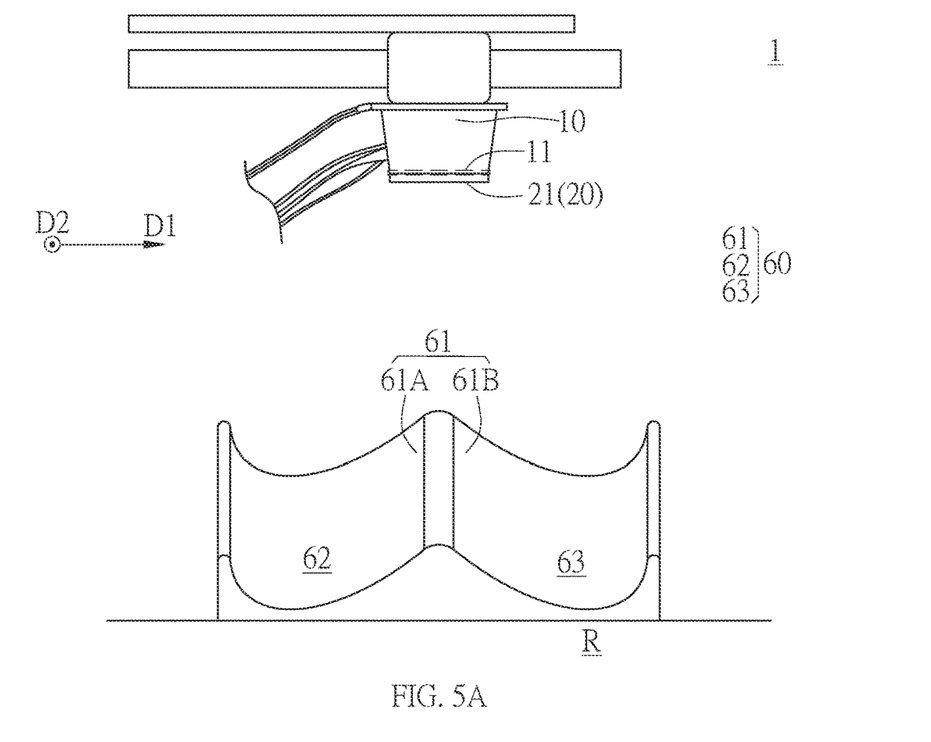
FIG. 5A illustrates a three-dimensional view of the pulse diagnosis device according to a variation embodiment of the present invention.
Figure 5B:
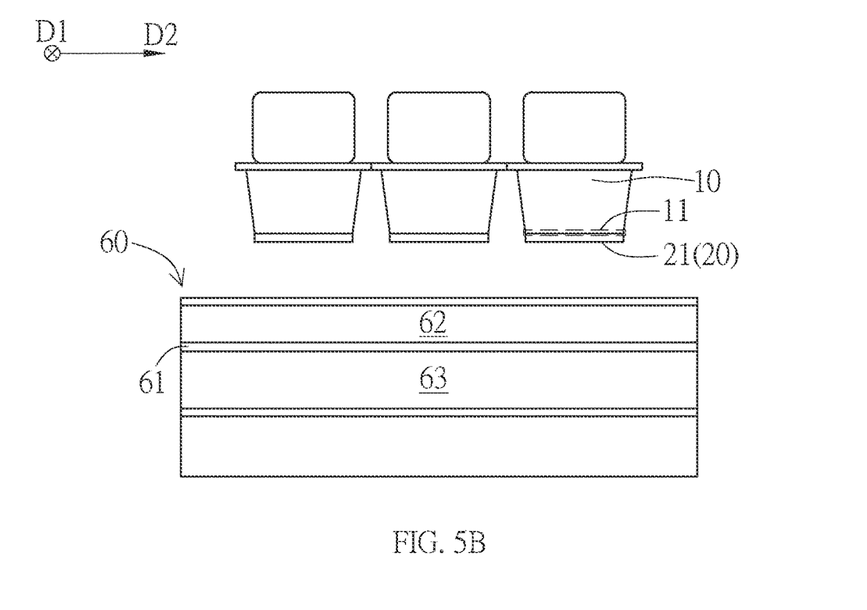
FIG. 5B illustrates a partial side view of the pulse diagnosis device according to a variation embodiment of the present invention.

Please refer to FIGS. 5A and 5B. FIG. 5A and FIG. 5B illustrate a three-dimensional view and a side view of the pulse diagnosis device 1 according to a variation embodiment of the present invention, respectively. As shown in FIG. 5A, in the present embodiment, the pulse diagnosis device 1 further includes a wearable mechanism 60 (such as a wrist placement mechanism) under the elements such as the bellow 10 and the sensor 20 and on a reference surface R (for example, a table surface on which the pulse diagnosis device 1 is disposed). In addition, in an actual application, as shown in FIG. 5B, the pulse diagnosis device 1 may include three sets of the bellow 10 and the sensor 20 corresponding to the pulses of inch, bar, and cubit, respectively; however, in the present invention, the number of the bellow 10 and the sensor 20 are not limited thereto.

Figure 5C:
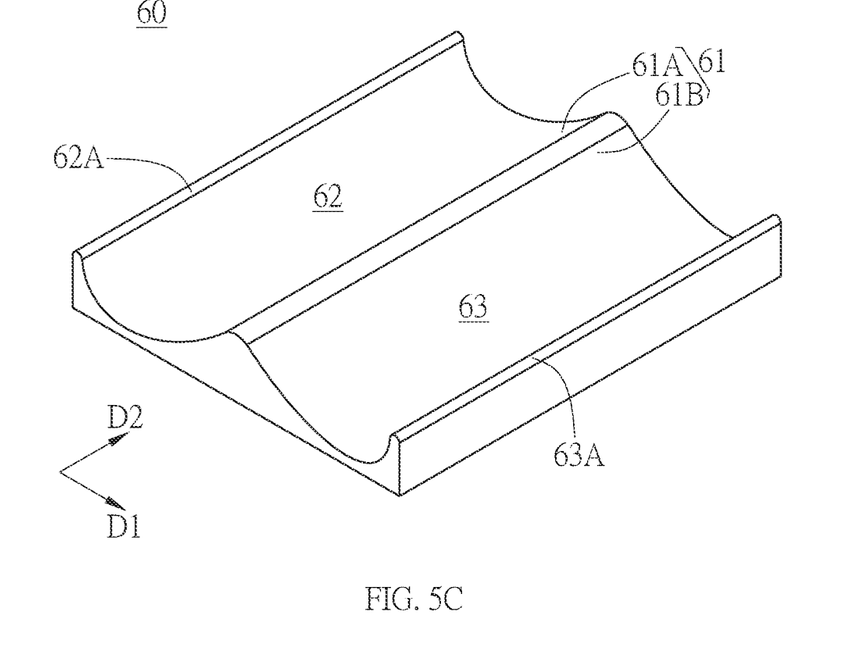
FIG. 5C illustrates a three-dimensional enlarged drawing of a wearable mechanism of the pulse diagnosis device according to a variation embodiment of the present invention.
Figure 5D:
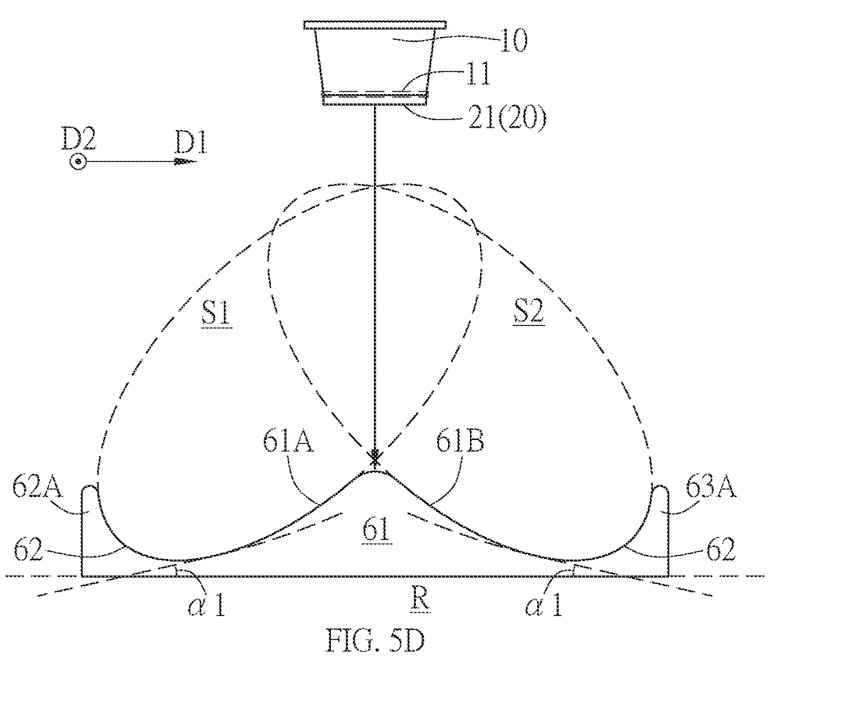
FIG. 5D illustrates the front view of the wearable mechanism of the pulse diagnosis device according to a variation embodiment of the present invention.
Figure 5E:
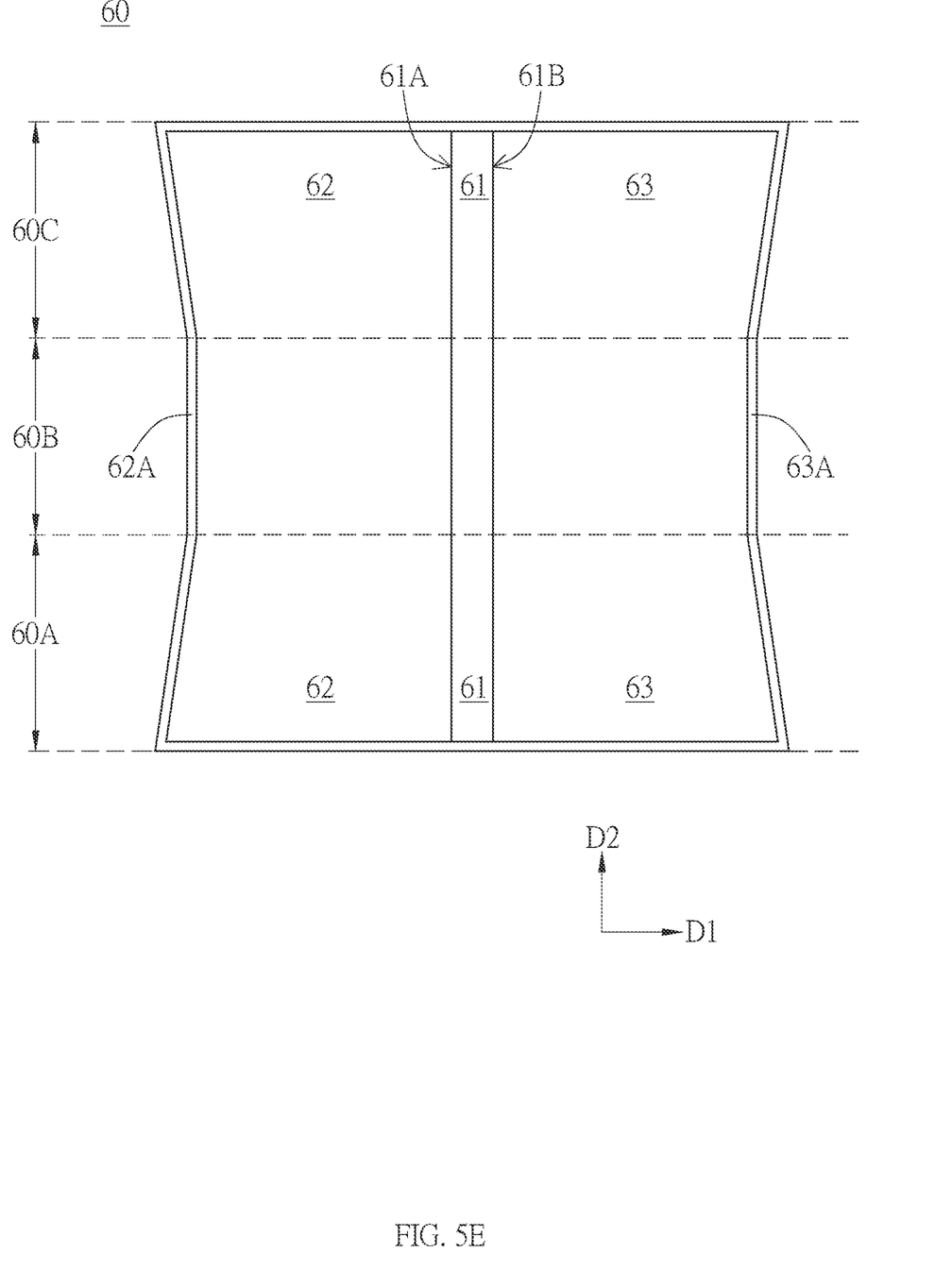
FIG. 5E illustrates the top view of the wearable mechanism of the pulse diagnosis device according to a variation embodiment of the present invention.

Please refer to FIGS. 5C, 5D and 5E. FIGS. 5C, 5D and 5E illustrate a three-dimensional enlarged drawing, the front-view, and the top-view of the wearable mechanism 60, respectively. As shown in FIGS. 5C, 5D and 5E, the wearable mechanism 60 includes a middle protruding portion 61, a first concave 62, and a second concave 63. The first concave 62 and the second concave 63 are located at opposite sides of the middle protruding portion 61. Specifically, the first concave 62 is located on the left side of the user and the second concave 63 is located on the right side of the user. Here, a first direction D1 is defined as the arrangement direction of the first concave 62, the middle protruding portion 61, and the second concave 63 (the transverse direction seen from the user), and a second direction D2 is defined as the extending direction of the first concave 62 and the second concave 63 (the front-to-back direction seen from the user).

Please continue to refer to FIG. 5C and FIG. 5D. As shown in FIG. 5C and FIG. 5D, the middle protruding portion 61 has a first curved surface 61A and a second curved surface 61B, the first curved surface 61A and the second curved surface 61B are connected to the first concave 62 and the second concave 63, respectively. Specifically, in the present embodiment, the left half part of the middle protruding portion 61 is the first curved surface 61A, and the right half part is the second curved surface 61B. The middle protruding portion 61 preferably has a lateral symmetrical structure, and the angle α1 included between the tangent line at the point of the first curved surface 61A (or the second curved surface 61B) having the maximum radius of curvature and the reference surface R ranges from 20 degrees to 30 degrees. In addition, the middle protruding portion 61 is preferably disposed corresponding to the sensing surface 11 (for example, they are collinear along the height direction; that is, the sensing surface 11 is located just above the middle protruding portion 61). In the aforementioned arrangement, as shown in FIG. 5D, the right-wrist pulse sensing area S1 which is generated when the right wrist is disposed on the first concave 62 along the first curved surface 61A and the left-wrist pulse sensing area S2 which is generated when the left wrist is disposed on the second concave 63 along the second curved surface 61B are at least partially overlapped. And the overlapped portion is opposite to the sensing surface 11. Therefore, when the sensing surface 11 moves down, pulses can be measured immediately; therefore, pulses of the right wrist and the left wrist can be measured without changing the position of the user and the pulse diagnosis device 1.

As mentioned above, pulses of both the left wrist and the right wrist can be measured even if both the user and the pulse diagnosis device 1 are located at the same positions through the designs of the wearable mechanism 60. However, in order to increase the accuracy of the measurement, the bellow 10 is configured to be movable along the first direction D1. For example, when the right wrist is measured, the bellow 10 is moved to a position corresponding to the first curved surface 61A, and when the left wrist is measured, the bellow 10 is moved to a position corresponding to the second curved surface 61B so as to further enhance the accuracy of the pulse measurement; however, the present invention is not limited thereto. The sensing surface 11 of the bellow 10 can also be located at a portion corresponding to the center of the middle protruding portion 61 (that is, the connecting portion between the first curved surface 61A and the second curved surface 61B).

Please refer to FIG. 5E. Since the total length of the wrist of most people ranges from 55 mm to 65 mm, the total length of the wearable mechanism 60 along the second direction D2 preferably ranges from 55 mm to 65 mm.

Please refer to FIG. 5C to FIG. 5E together. In the present embodiment, the first concave 62 and the second concave 63 has a first wall 62A and a second wall 63A adjacent to the first curved surface 61A and the second curved surface 61B of the middle protruding portion 61, respectively. The wearable mechanism 60 may have a front-end portion 60A close to the user, a middle portion 60B, and a back-end portion 60C along the second direction D2; that is, the front-end portion 60A and the back-end portion 60C are located at opposite sides of the middle portion 60B. Wherein, the first wall 62A and the second wall 63A extend respectively to incline toward a direction away from the middle protruding portion 61 in the front-end portion 60A and the back-end portion 60C. In addition, in the middle portion 60B, the first wall 62A and the second wall 63A extend along the direction parallel to the middle protruding portion 61 and do not incline. Furthermore, the lengths of each of the front-end portion 60A, the middle portion 60B, and the back-end portion 60C along the second direction D2 are preferably equal (that is, the length of each of the front-end portion 60A, the middle portion 60B, and the back-end portion 60C along the second direction D2 is preferably about 20 mm). Through this design, the first concave 62 and the second concave 63 respectively correspond to shapes of the wrists, so that the right wrist and the left wrists may be disposed thereon. However, the present invention is not limited thereto. For example, the first wall 62A and the second wall 63A may also extend to incline toward a direction away from the middle protruding portion 61 only in the front-end portion 60A and extend along the direction parallel to the middle protruding portion 61 and not incline in both the middle portion 60B and the back-end portion 60C.

A variation embodiment may be carried out to be combined with any one of the first to fourth embodiments.

The mentioned contents merely represent some better mode embodiments of the present disclosure. Please note that various changes and modifications of the present disclosure are allowed without departing from the conception principles of the present invention. People skilled in the art should understand that the scope of the present disclosure are defined by claims, and various replacements, combinations, modifications, and shifting based on intention of the present disclosure are all viewed as being embraced by the scope of the present disclosure.

What is claimed is:

1. A pulse diagnosis device, comprising:
   at least one bellow having a sensing surface, each sensing surface having a first end and a second end opposite to each other;
   at least one sensor disposed on a respective sensing surface and having a respective sensing area, each sensing area at least partially extending from a respective first end to a respective second end or beyond the respective second end;
   and at least one positioning element at least partially disposed along a respective second end to position a respective sensor at the respective second end,
   wherein each sensing area at least partially does not overlap with a respective positioning element,
   wherein each bellow has a bottom surface opposite to its respective sensing surface, and the bottom surface is made of a hard material,
   wherein each positioning element includes a first portion and a second portion disposed on a respective first end and a respective second end, respectively,
   wherein each first portion and each first end define a first opening, and each second portion and each second end define a second opening,
   and wherein each sensor at least partially extends from a respective first opening to a respective second opening or out of the respective second opening, and each respective sensing area is located between a respective first portion and a respective second portion.

2. The pulse diagnosis device of claim 1, further comprising:
   a tube, wherein the tube is connected to a portion of a bellow of the at least one bellow near its bottom surface relative to its sensing surface;
   and an air pump connected to the bellow of the at least one bellow through the tube and configured to inflate the bellow.

3. The pulse diagnosis device of claim 2, further comprising a bottom plate located under each bottom surface, wherein each bottom plate is made of a hard material.

4. The pulse diagnosis device of claim 1, wherein each positioning element further includes a third portion and a fourth portion opposite to each other, and each of the third portion and the fourth portion is connected between a respective first portion and a respective second portion,
   wherein the respective first portion, the respective second portion, the third portion, and the fourth portion together enclose a window portion,
   and wherein each sensing area at least partially overlaps a respective window portion.

5. The pulse diagnosis device of claim 4, wherein each positioning element further includes a first surface and a second surface opposite to each other,
   wherein the first surface is configured to extend from a respective first end to a respective bottom surface along a respective bellow,
   wherein the second surface is configured to extend from a respective second end to the respective bottom surface along the respective bellow,
   wherein a first hole is defined in the first surface, and
   wherein a second hole is defined in the second surface.

6. The pulse diagnosis device of claim 1, wherein each positioning element further includes a first surface and a second surface opposite to each other,
   wherein the first surface is configured to extend from a respective first end to a respective bottom surface along a respective bellow,
   wherein the second surface is configured to extend from the respective second end to the respective bottom surface along the respective bellow, and
   wherein a first hole is defined in the first surface, and wherein a second hole is defined in the second surface.

7. The pulse diagnosis device of claim 6, further comprising a tube connected to a portion of the respective bellow near the respective bottom surface relative to the respective sensing surface,
   wherein an opening portion is located between the first surface and the respective bottom surface, and
   wherein the tube is connected to the respective bellow through the opening portion.

8. The pulse diagnosis device of claim 1, further comprising a wearable mechanism located over a reference surface, wherein the wearable mechanism comprises a middle protruding portion, a first concave, and a second concave, and the first concave and the second concave are located at opposite sides of the middle protruding portion.

9. The pulse diagnosis device of claim 8, wherein each sensing surface is disposed above the wearable mechanism such that a vertical projection of the sensing surface overlaps the middle protruding portion, and is positioned closer to a centerline of the middle protruding portion than to that of the first concave and the second concave.

10. The pulse diagnosis device of claim 9, wherein the first concave, the middle protruding portion, and the second concave are disposed and arranged along a first direction, and
    wherein each bellow is configured to be movable along the first direction.

11. The pulse diagnosis device of claim 10, wherein a total length of the wearable mechanism along a second direction ranges from 55 mm to 65 mm, and the second direction is different from the first direction.

12. The pulse diagnosis device of claim 8, wherein the middle protruding portion has a first curved surface and a second curved surface connected to the first concave and the second concave, respectively, and a first angle included between the first curved surface and the reference surface and a second angle included between the second curved surface and the reference surface range from 20 degrees to 30 degrees.

13. The pulse diagnosis device of claim 8, wherein the wearable mechanism further comprises a first wall and a second wall opposing the middle protruding portion, and the first wall and the middle protruding portion define the first concave and the second wall and the middle protruding portion define the second concave, respectively, wherein the first wall, the first concave, the middle protruding portion, the second concave, and the second wall are arranged along a first direction, wherein the wearable mechanism is divided into afront-end portion, a middle portion, and a back-end portion along a second direction that crosses the first direction;

wherein each of the first wall and the second wall extends to be inclined with respect to the second direction, such that each of the first wall and the second wall extends outward from the middle protruding portion in the front-end portion.

14. The pulse diagnosis device of claim 13, wherein the front-end portion and the back-end portion are opposite to each other with the middle portion therebetween, wherein each of the first wall and the second wall extends along a direction parallel to the middle protruding portion in the middle portion, and wherein each of the first wall and the second wall extends to be inclined with respect to the second direction, such that each of the first wall and the second wall extends outward from the middle protruding portion in the back-end portion.

* * * * *